Feb. 27, 1968    E. AUCKTOR    3,370,441
CONSTANT VELOCITY NONTELESCOPIC JOINT
Filed Oct. 20, 1965    3 Sheets-Sheet 1

Inventor
ERICH AUCKTOR
By: Nolte & Nolte
ATTORNEYS

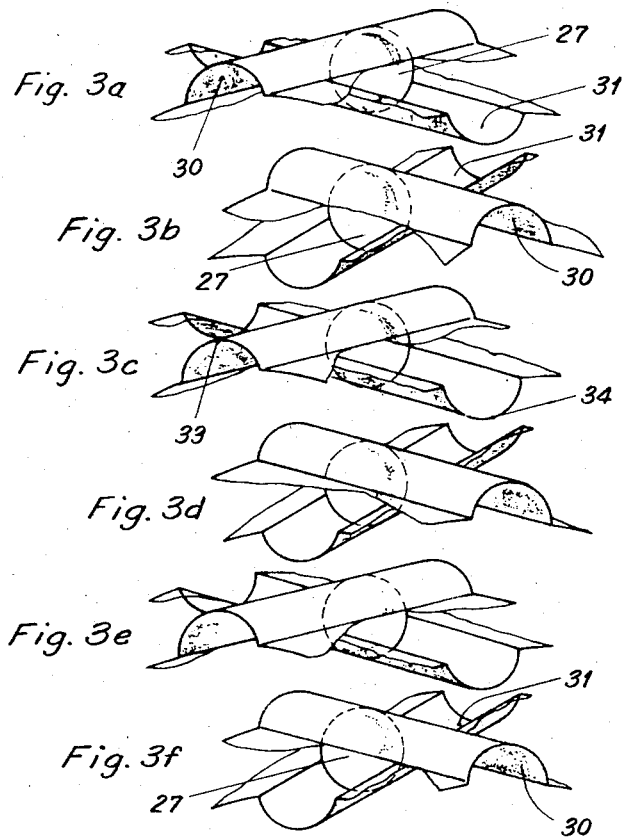

Feb. 27, 1968  E. AUCKTOR  3,370,441
CONSTANT VELOCITY NONTELESCOPIC JOINT
Filed Oct. 20, 1965  3 Sheets-Sheet 3

Inventor
ERICH AUCKTOR
By: Nolte & Nolte
ATTORNEYS 3,370,441
CONSTANT VELOCITY NONTELESCOPIC JOINT
Erich Aucktor, Offenbach am Main, Germany, assignor to
  Lohr & Bromkamp G.m.b.H., Offenbach am Main,
  Germany
Filed Oct. 20, 1965, Ser. No. 498,304
Claims priority, application Germany, June 10, 1965,
L 50,884
5 Claims. (Cl. 64—21)

ABSTRACT OF THE DISCLOSURE

A constant velocity nontelescopic joint is disclosed which includes inner and outer joint elements each provided with longitudinal grooves and which includes a plurality of balls guided in said grooves for transmitting torque between said joint elements. The longitudinal center lines of these longitudinal grooves open in wedge-fashion in pairs alternately in opposite directions or cross one another in pairs with alternate opposite inclination. A cage is disposed between the joint elements for retaining the balls in coplanar fashion during all relative positions of the two joint elements. The cage is nondisplaceably guided only on one of said joint elements whereas it has a clearance relative to the other joint element. The cage and the balls in the grooves form the only means for holding the joint elements together.

---

The invention relates to a constant velocity joint called a constant velocity nontelescopic joint, in contrast to joints which have a telescopic feature. In joints of this kind the torque is transmitted by balls guided between an inner and outer joint element in longitudinal grooves in both such elements, the longitudinal center-lines of the grooves either open in a wedge-fashion in pairs alternately in opposite directions or, in a preferred form, cross one another in pairs with alternate opposite inclination, the balls being retained in coplanar fashion in apertures formed in a cage which is disposed between the joint elements and which is nondisplaceably guided on one joint element, and is disposed with clearance relative to the other joint element.

To provide the constant velocity feature in joints of this kind, the balls of course must always be disposed in a plane which at all angles of bending of the joint extends along the bisector of an angle formed by the axes of the two joint elements and vertically with respect to the plane formed by these two axes.

Efforts have been made to meet this requirement and also to hold two joint elements of a nontelescopic type of joint together just by guidance provided by grooves (FIGS. 1 to 7 of French Patent No. 1,177,760 of Bellomo). A known construction comprises four balls whose associated grooves extend at different directions to the joint axis in all four cases connected with the four possibilities which exist for the condition of two opposite and equal cone inclinations and two opposite and equal skew inclinations. This joint ceases to operate satisfactorily when the crossing angle of the associated grooves becomes so small as the joint bends that the grooves cease to guide the balls satisfactorily, more particularly with the result that the balls move away from the plane associated with constant velocity. The joint then ceases to run quietly and homokinetically. To produce reliable joints of this kind, the crossing angle of the grooves must be very large, with the result that pressures on the guideway are large. Of course, the known construction can be developed by multiplying the four groups of grooves. However, when, as in the kind of joint just described, only two groups of grooves are used which open alternately in a wedge-fashion in opposite directions, or cross one another in pairs with an inclination which is alternately oppositely directed, the disadvantages of the known construction are obviated, since relatively small crossing angles or wedge angles reduce the above mentioned pressure loading; however, a cage must be provided for the balls, otherwise the balls, when transmitting torque, tend to move apart axially from one another, alternately in opposite directions, in accordance with the two groups of grooves. The balls are retained in elongated apertures in the cage, the length of the apertures being arranged to suit the separating movement of the balls peripherally when the joint bends, and allowing the balls to move radially but preventing the balls from moving away from their common plane. To prevent the cage from rattling by being knocked backwards and forwards between the two joint elements, it is known for the cage to be guided on one joint element, and in this connection it is also known for clearance to be left between the cage and the other joint element in order to reduce unnecessary friction.

To provide the constant velocity feature in joints of this kind which comprise a cage, a large number of groove shapes are known, and a feature shared by all of such joints resides in that the longitudinal center-line of the associated longitudinal grooves in the inner and outer joint elements—i.e., grooves which cooperate to guide a ball—include an angle with one another. To achieve this in one known kind of joint, the longitudinal center-lines of the associated longitudinal grooves in the inner and outer joint elements are portions of helixes, of opposite and equal pitch, of surfaces of rotation around the corresponding joint element axes, or tangents to such helixes. In a special form of this construction, the longitudinal center-lines may in known manner be tangents to conical surfaces or arcs or, as a variant, any other form of continuous lines.

Whereas in this known construction the intersecting longitudinal center-lines extend askew of the joint element axis—i.e. of the shaft fitted to the joint element—the associated longitudinal grooves of another known construction extend in common planes containing the common axis of the aligned shafts so that the associated longitudinal grooves cooperate to form an opening wedge or beak. As in the previous case mentioned, the longitudinal grooves may have any continuous pattern; in most practical applications, the longitudinal grooves are straight or arcuate.

The only precaution required in these constructions is that the crossing angle of the longitudinal center-lines, or the wedge angle of the longitudinal groove which open in a wedge fashion, must be greater than the angle of friction to the cooperating materials used for the balls and longitudinal grooves in the joint elements, to ensure that self-jamming of the balls moving in the grooves is overcome.

The fact that, in a non-telescopic joint of the kind specified in which the longitudinal grooves open in a wedge-fashion, the wedges open alternately in opposite directions or in the case of longitudinal grooves which cross in pairs, the rise of the longitudinal grooves of any one joint element is directed alternately in opposite directions serves of course to prevent the balls from exerting an axial thrust on the cage, for more particularly at high speeds any such thrust acts as friction between the cage and the joint elements and leads to a corresponding unwanted heating. To reduce the thrust, the balls apply alternately opposite pressures to the cage so that the pressures cancel one another. In constant velocity joints of this kind, therefore, the balls are retained in two groups of groove pairs.

It is known from U.S. Patent No. 2,322,570 (Dodge) to hold together a non-telescopic joint of the kind just described in detail by spherical surface zones of the outer joint element embracing corresponding spherical surface zones of the inner joint element, a partly spherical cage being disposed between the zones of the respective elements. It is known from this construction that the spherical surface zones should be provided only on the sides near the two shaft extensions of the joints for preventing the joint from pulling apart, while in the central zone of the joint the two joint elements are cylindrical and spaced from the cage in order to reduce friction losses and to arrive at a simple construction using simple elements. It has been found that with this construction, heating and wear still occur in the region of the partly spherical retaining surfaces. Also, it is a relatively difficult task to produce components having retaining surfaces in the form of spherical zones.

It is therefore an object of the invention to provide an improved non-telescopic joint.

It is another object of the invention to provide an improved non-telescopic joint having very low friction losses.

The invention accordingly starts from the knowledge, which has not previously been realized in the construction of joints of the kind specified, that two joint elements of a non-telescopic joint of the kind specified, with a wedge angle of the longitudinal grooves opening alternately in opposite directions or with alternate direction of the inclination of the longitudinal grooves of a joint element in a construction comprising pairwise crossing longitudinal grooves, center themselves radially and require no further axial retaining means if the balls are constrained to remain in a plane such as by the cage of the kind specified wherein the cage is arranged to be non-movable relative to one of the joint elements. According to the invention, therefore, the two joint elements are held together only through the agency of the cage.

The joint according to the invention is free from axial reaction forces and is therefore particularly suitable for high-speed operation, is very simple to manufacture and assemble, and gives completely satisfactory operation.

Preferably, to ensure high efficiency of the joint, the angle of inclination of the grooves or, where applicable, the wedge angle, is so chosen as to be best for satisfactory control at the proposed maximum bending angle. This is the case of the skew angle in a joint formed with crossing longitudinal grooves is substantially equal to the maximum bending angle, or the wedge angle in the case of a joint formed with longitudinal grooves which open in a wedge-fashion is only slightly greater than the angle of friction of the material. The latter angle must in any case of course, be large enough to ensure that there is no self-locking of the balls moving in the grooves. Assuming a normal maximum bending angle of 20°, an angle of inclination of 20° may be considered.

Often, only a weak cage is used, in accordance with the invention, to retain the balls, particularly when the joint is required to run at high speeds and the torque to be transmitted is small.

At lower speeds and torque, a more rigid cage would be required because tension is applied to the cage webs between the window apertures. However, since the joint element according to the invention requires only very short window lengths in the cage because the amount which the balls can move in the cage depends only upon the magnitude of the bending angle, and also because, the joint being intended for high speeds, only relatively small bending angles—as a rule of up to about 20°— actually occur in practice, therefore, the distance between any two consecutive cage windows is relatively large. Even in thin cages, the cross-sectional surface of the web, given by the product of the spacing between consecutive cage windows with the cage wall thickness, should receive the force of the balls, therefore, it is still fairly large, so that thin cages are able to cope with heavy stresses and exhibit a high reliability factor in operation.

An important factor for an understanding of the invention is that the ball-retaining function of the cage is independent of cage movement, since the stressing of the cage by the balls when the joint bends takes the form merely of a tension applied to the cage webs. Consequently, no reaction is transmitted to the joint elements and therefore the ball-retaining function of the cage does not limit the movement thereof. On the other hand, when the joint is stressed axially, the axially applied force acts as an extra tension on the cage webs, and the cage in turn bears against the joint element which guides it.

As is conventional, therefore, the cage has considerable surface hardness in the window areas, to bear the balls, and a tough core in the webs between the windows to deal with the tension. The sliding properties of the cage should be such as enable ready movement relatively to the cage-building joint element.

The invention will become more readily apparent from the following description of preferred embodiments thereof, with reference to the accompanying drawings, wherein.

Figure 2:
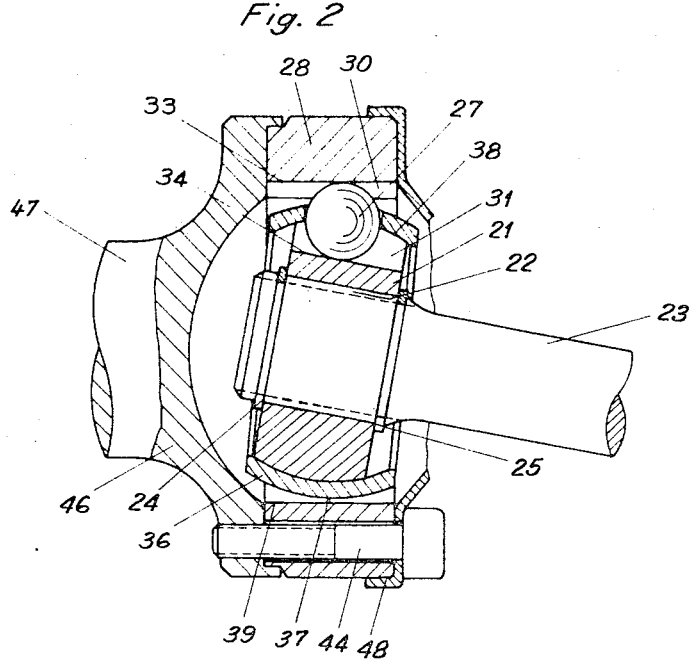
FIG. 2 is a longitudinal section through another form of a joint according to the invention wherein rectilinear longitudinal grooves, shown as pivoted into the plane of the drawing, cross one another, the cage being guided on the inner joint element.
Figure 4:
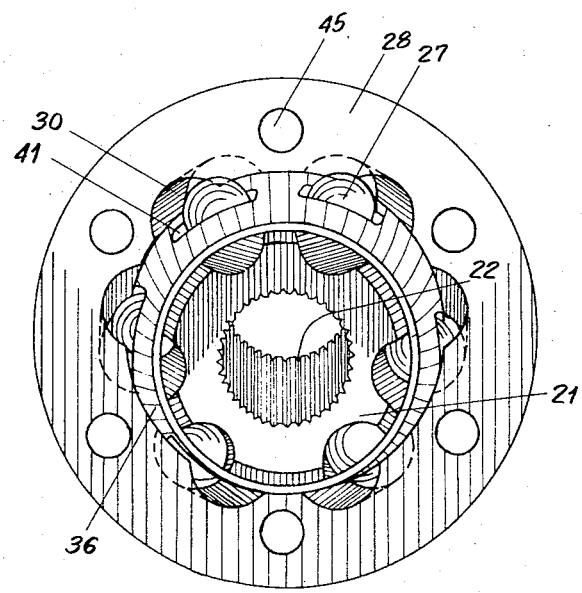

FIGS. 3a to 3f diagrammatically illustrate the grooves and balls of the joint of FIG. 2 extending over the circumference of the joint placed into one plane and particularly illustrating how the balls are retained at the intersections of the rectilinear grooves, which are disposed at an inclination directed alternately in opposite directions, and FIG. 4 is an end view of the joint shown in FIG. 2, partly in section, the joint being assembled in a simple manner by the inner joint element, with the cage fitted on it and the balls fitted in it, being pivoted into the outer joint element.

Figure 1:
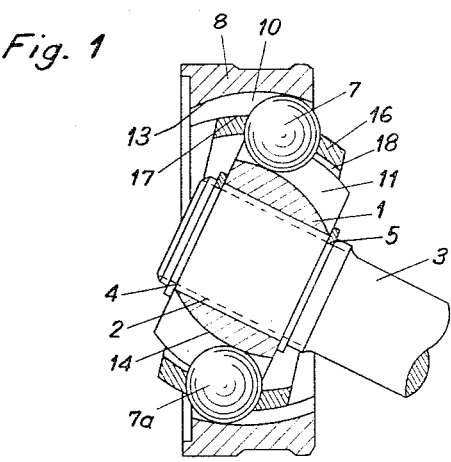
FIG. 1 is a longitudinal section through a non-telescopic joint according to the invention, the joint comprising longitudinal grooves which extend in a wedge-fashion, a cage being guided in the outer joint element.

In the embodiment shown in FIG. 1, an inner joint element 1 is connected by splining 2 to a shaft 3 (shown fragmented) and is secured by snap rings 4, 5 at both ends. The inner joint element 1 is guided in an outer joint element 8 by balls 7, 7a; the joint element 8 is adapted to be connected to a shaft (not shown). Each ball 7 runs in a longitudinal groove 10 in the outer joint element 8 and in a longitudinal groove 11 in the inner joint element 1. The groove 10 has an arcuate root 13 and the groove 11 has an arcuate root 14. These grooves or their roots extend in the plane of the drawing which plane passes through the axes of two joint elements, and open like a wedge-shaped beak alternately in opposite directions; in FIG. 1, the groove wedge associated with the ball 7a opens to the left and the wedge associated with the other ball 7 opens to the right. The balls 7, 7a, are retained in one plane by a cage 16 which is of partly spherical shape, the latter plane bisecting the angle resulting by a bending of the joint. In the embodiment shown in FIG. 1, the cage is guided in the outer joint element 8 and is at a distance 18 from the inner joint element 1. The two joint elements 1, 8 are held together only through the agency of the cage 16 which is guided on a surface 17 of the outer joint element 8 and which retains in a plane of constant-velocity, balls 7, 7a received in the longitudinal grooves 10, 11 in the two joint elements.

In the embodiment shown in FIG. 2, an inner joint element 21 is connected by splining 22 to a shaft 23, (shown fragmented) and non-displaceably retained thereon by snap rings 24, 25. Through the agency of balls 27, of which only one can be seen in the particular sectional view of FIG. 2, the inner element 21 is guided in an outer joint element 28, the balls 27 engaging in a rectilinear longitudinal groove 30 in the outer element 28 and in a rectilinear longitudinal groove 31 in the inner element 21. As shown by reference characters 33, 34, the roots of these two grooves are also rectilinear. The balls 27 are disposed at the intersection of the grooves 30, 31. This fact is more clearly apparent from FIGS. 3a to 3f. Whereas in FIG. 2 the longitudinal grooves are shown as having been pivoted into the plane of the drawing, in FIG. 3a to 3f the longitudinal grooves 30, 31 are shown physically in developed form along the peripheral circle retaining the balls 27. Clearly, the angle of inclination of the grooves in any single joint element 21 or 28 alternates so that for instance, the grooves 30 extend first diagonally from the bottom left to the top right (FIGS. 3b, 3d, 3f), then diagonally from the top left to the bottom right (FIGS. 3a, 3c, 3e).

The balls are retained in a coplanar relationship in a cage 36, the balls extending through windows 41 which are more clearly visible in FIG. 4. The windows 41 are so elongated in the peripheral direction that the balls can move peripherally when the joint bends; the windows 41 also allow radial movement of the balls but merely retain the same axially so that the balls are aways disposed in one plane.

In this embodiment the cage 36, which is of partly-spherical shape, is guided on a spherical surface 38 of the inner joint element 21 and is disposed at a distance 37 from a cylindrical inside surface 39 of the other joint element 28.

The element 28 is connected by threaded pins 44, which extend through passages 45 (FIG. 4) in the outer joint element 28, to an end portion 46 of a shaft 47 (FIG. 2). The pins 44 also secure a protective cap 48 (FIG. 2) to the outer joint element 28 on the side thereof adjacent the shaft 23 associated with the inner joint element 21.

As can be readily seen from FIG. 4, the inner joint element 21 on which the cage 36 with the balls 27 is fitted, can readily be slid at assembly into the outer joint element 28; the insertion starts by way of two balls while the inner joint element with the cage and balls in it is tilted, whereafter this unit, with the outer joint element in the central position, is pivoted into the final position around the two guiding balls.

Although the invention has been described with reference to preferred embodiments thereof, it is however, not intended that the invention be limited to such embodiments only, but it should be defined by the scope of the appended claims.

What is claimed is:
1. A constant velocity non-telescopic joint comprising: an inner and an outer joint element, longitudinal grooves in said inner and outer joint elements, balls guided and longitudinally displaceable in said grooves for transmitting torque between said joint elements, the longitudinal center-lines of said grooves opening in a wedge-fashion in pairs alternately and in opposite directions, cage means disposed between said joint elements for retaining said balls in co-planar fashion in said grooves and in apertures formed in said cage means, said cage means and said joint elements being longitudinally non-displaceably guided and angularly displaceable with respect to each other, said cage means being unilaterally centered on one of said joint elements only and disposed with clearance relative to the other joint element, said cage means and said balls in said grooves forming the only means for holding said joint elements longitudinally non-displaceable with respect to each other.

2. A joint according to claim 1, wherein said cage means is guided and centered on said inner joint element only and wherein the interior of said outer joint element is cylindrical.

3. A joint according to claim 1, wherein said cage means is guided and centered on said outer joint element only.

4. A constant velocity non-telescopic joint comprising: an inner and an outer joint element, longitudinal grooves in said inner and outer joint elements, balls guided and longitudinally displaceable in said grooves for transmitting torque between said joint elements, the longitudinal center lines of said grooves crossing one another in pairs with alternate opposite inclination, cage means disposed between said joint elements for retaining said balls in coplanar fashion in said grooves and in apertures in said cage means, said cage means and said joint elements being longitudinally non-displaceably guided and angularly displaceable with respect to each other, said cage means being unilaterally centered on one of said joint elements only and disposed with clearance relative to the other joint element, said cage means and said balls in said grooves forming the only means for holding said joint elements longitudinally non-displaceable with respect to each other.

5. A joint according to claim 4, wherein said cage means is guided and centered on said inner joint element only and wherein the interior of said outer joint element is cylindrical.

References Cited
UNITED STATES PATENTS

| | | | |
|---|---|---|---|
| 2,309,939 | 2/1943 | Dodge | 64—7 |
| 2,322,570 | 6/1943 | Dodge | 64—21 |
| 2,875,600 | 3/1959 | Miller | 64—21 |
| 3,607,595 | 12/1962 | Faure | 64—21 |
| 3,076,323 | 2/1963 | Aucktor | 64—21 |
| 3,128,613 | 4/1964 | Faure | 64—21 |
| 3,287,934 | 11/1966 | Asher | 64—21 |

FOREIGN PATENTS

| | | |
|---|---|---|
| 810,289 | 3/1959 | Great Britain. |

HALL C. COE, *Primary Examiner.*

FRED C. MATTERN, MILTON KAUFMAN,
*Examiners.*